(12) United States Patent
Li et al.

(10) Patent No.: US 12,213,107 B2
(45) Date of Patent: Jan. 28, 2025

(54) TRANSMISSION CHANNEL CONFIGURATION METHOD AND APPARATUS, TRANSMISSION CHANNEL SENDING METHOD AND APPARATUS, DEVICE AND STORAGE MEDIUM

(71) Applicant: ZTE CORPORATION, Shenzhen (CN)

(72) Inventors: Xincai Li, Shenzhen (CN); Yajun Zhao, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 373 days.

(21) Appl. No.: 17/774,809

(22) PCT Filed: Nov. 9, 2020

(86) PCT No.: PCT/CN2020/127522
§ 371 (c)(1),
(2) Date: May 5, 2022

(87) PCT Pub. No.: WO2021/089043
PCT Pub. Date: May 14, 2021

(65) Prior Publication Data
US 2022/0408420 A1 Dec. 22, 2022

(30) Foreign Application Priority Data
Nov. 8, 2019 (CN) .......................... 201911089428.7

(51) Int. Cl.
*H04W 72/044* (2023.01)
*H04L 5/00* (2006.01)
(Continued)

(52) U.S. Cl.
CPC ......... *H04W 72/044* (2013.01); *H04L 5/0051* (2013.01); *H04W 72/23* (2023.01); *H04W 74/0808* (2013.01)

(58) Field of Classification Search
None
See application file for complete search history.

(56) References Cited

U.S. PATENT DOCUMENTS

2013/0315188 A1* 11/2013 Pajukoski ............. H04W 72/20
370/329
2014/0044084 A1* 2/2014 Lee ....................... H04L 1/1861
370/329

(Continued)

FOREIGN PATENT DOCUMENTS

CN 103458420 A 12/2013
CN 103716895 A 4/2014
(Continued)

OTHER PUBLICATIONS

International Search Report for Application No. PCT/CN2020/127522, dated Jan. 29, 2021, 4 pages including English translation.

(Continued)

*Primary Examiner* — Anh Ngoc M Nguyen
(74) *Attorney, Agent, or Firm* — Morgan, Lewis & Bockius LLP

(57) ABSTRACT

Provided are a transmission channel configuration method and apparatus, a transmission channel sending method and apparatus, a device and a storage medium. The transmission channel configuration method includes sending resource configuration information to a user equipment and receiving the transmission channel according to the resource configuration information. The resource configuration information includes time-domain resource information, frequency-domain resource information and space direction information, (Continued)

and the resource configuration information is used for configuring the sending mode of a transmission channel of the user equipment.

16 Claims, 5 Drawing Sheets

(51) Int. Cl.
*H04W 72/23* (2023.01)
*H04W 74/0808* (2024.01)

(56) References Cited

U.S. PATENT DOCUMENTS

| | | | |
|---|---|---|---|
| 2017/0245165 | A1 | 8/2017 | Onggosanusi et al. |
| 2018/0192405 | A1* | 7/2018 | Gong ................. H04L 1/0045 |
| 2018/0242348 | A1 | 8/2018 | Kannan et al. |
| 2019/0230706 | A1 | 7/2019 | Li et al. |
| 2022/0408429 | A1* | 12/2022 | Choi ................. H04W 72/21 |
| 2023/0047193 | A1* | 2/2023 | Lehti ................. H04W 72/1263 |
| 2023/0132212 | A1* | 4/2023 | Gao ................. H04L 1/1812 370/329 |

FOREIGN PATENT DOCUMENTS

| | | |
|---|---|---|
| CN | 107889244 A | 4/2018 |
| CN | 108631976 A | 10/2018 |
| CN | 109121207 A | 1/2019 |
| CN | 109792751 A | 5/2019 |
| CN | 110114990 A | 8/2019 |
| CN | 110149703 A | 8/2019 |
| CN | 110167187 A | 8/2019 |
| CN | 110366248 A | 10/2019 |
| CN | 111107555 A | 5/2020 |
| WO | WO-2018026182 A1 | 2/2018 |
| WO | WO-2019160354 A1 | 8/2019 |

OTHER PUBLICATIONS

ZTE "Discussion on channel access mechanism for NR-U", 3GPP TSG RAN WG1 Meeting #94bis R1-1810326, Chengdu, China, Oct. 8-12, 2018, 6 pages.
ZTE, et al. "Discussion on channel access procedure for NR-U", 3GPP TSG RAN WG1 Meeting #96Bis, R1-1903873, Xian, China, Apr. 8-12, 2019, 10 pages.
Qualcomm Incorporated "Feature lead summary on initial access signals and channels for NR-U", 3GPP TSG RAN WG1 Meeting #97, R1-1907733, Reno, USA, May 13-17, 2019, 43 pages.
Qualcomm Incorporated "Summary of NR-U agreements till RAN1 #98", 3GPP TSG RAN WG1 Meeting #99, R1-1911721, Reno, USA, Nov. 18-22, 2019, 26 pages.
Extended European Search Report of Application No. 20884830.9, dated Nov. 8, 2023, 10 pages.
Huawei, et al. "Transmission with configured grant in NR licensed band", 3GPP TSG RAN WG1 Meeting #98bis R1-1910048, Chongqing, China Oct. 14-20, 2019, 22 pages.
Nokia, et al. "Feature Lead's Summary on Channel Access Procedures", 3GPP TSG RAN WG1 Meeting #96bis R1-1904187, Xian, China Apr. 8-12, 2019, 19 pages.
Office Action of Chinese Application No. 201911089428.7, dated Dec. 7, 2022, 10 pages including translation.
Search Report of Chinese Application No. 201911089428.7, dated Nov. 29, 2022, 8 pages including translation.

* cited by examiner

TRANSMISSION CHANNEL CONFIGURATION METHOD AND APPARATUS, TRANSMISSION CHANNEL SENDING METHOD AND APPARATUS, DEVICE AND STORAGE MEDIUM

CROSS-REFERENCE TO RELATED APPLICATIONS

This is a national stage application filed under 37 U.S.C. 371 based on International Patent Application No. PCT/CN2020/127522, filed on Nov. 9, 2020, which claims priority to Chinese Patent Application No. 201911089428.7 filed with the China National Intellectual Property Administration (CNIPA) on Nov. 8, 2019, the disclosure of which is incorporated herein by reference in its entirety.

TECHNICAL FIELD

The present application relates to radio communication networks, for example, a transmission channel configuration method and apparatus, a transmission channel sending method and apparatus, a device and a storage medium.

BACKGROUND

In New Radio (NR) R15 and R16, the NR system can support a highest frequency of 52.6 GHz. In later versions such as R17, the NR system can support a higher frequency band. However, in a higher frequency band, since channel fading and multipath interference are greater, the coverage performance of an uplink transmission channel is lower, and thus the data transmission efficiency is lower.

SUMMARY

The present application provides a transmission channel configuration method and apparatus, a transmission channel sending method and apparatus, a device and a storage medium.

The transmission channel configuration method is provided. The method includes sending resource configuration information to a user equipment and receiving the transmission channel according to the resource configuration information.

The resource configuration information includes time-domain resource information, frequency-domain resource information and spatial direction information. Moreover, the resource configuration information is used for configuring the sending mode of a transmission channel of the user equipment.

The transmission channel sending method is provided. The method includes receiving resource configuration information sent by a base station, configuring the sending mode of a transmission channel according to the resource configuration information and sending the transmission channel.

The resource configuration information includes time-domain resource information, frequency-domain resource information and spatial direction information.

The transmission channel configuration apparatus is provided. The apparatus includes a first sending module and a first receiving module.

The first sending module is configured to send resource configuration information to a user equipment. The resource configuration information includes time-domain resource information, frequency-domain resource information and spatial direction information. Moreover, the resource configuration information is used for configuring the sending mode of a transmission channel of the user equipment.

The first receiving module is configured to receive the transmission channel according to the resource configuration information.

The transmission channel sending apparatus is provided. The apparatus includes a second receiving module and a second sending module.

The second receiving module is configured to receive resource configuration information sent by a base station. The resource configuration information includes time-domain resource information, frequency-domain resource information and spatial direction information.

The second sending module is configured to configure the sending mode of a transmission channel according to the resource configuration information and send the transmission channel.

The device is provided. The device includes one or more processors and a memory.

The memory is configured to store one or more programs.

When executed by the one or more processors, the one or more programs cause the one or more processors to implement any method provided by the embodiments of the present application.

The storage medium is provided. The storage medium is for storing computer programs which, when executed by a processor, implement any method provided by the embodiments of the present application.

DETAILED DESCRIPTION

Embodiments of the present application are described hereinafter in detail in conjunction with the drawings. It is to be noted that if not in collision, embodiments of the present application and features therein may be combined with each other in any manner.

The processes illustrated in the flowcharts among the drawings may be performed by, for example, a computer system capable of executing a set of computer-executable instructions. Moreover, although logical sequences are illustrated in the flowcharts, the processes illustrated or described may be performed in sequences different from those described here in some cases.

The technical solutions of the present application may be applied to various communication systems such as the Global System for Mobile Communications (GSM), the code-division multiple access (CDMA) system, the wideband code-division multiple access (WCDMA) system, the General Packet Radio Service (GPRS), the Long Term Evolution (LTE) system, the Long Term Evolution Advanced (LIE-A) system, the Universal Mobile Telecommunications System (UMTS) and the 5th generation mobile communication (5G) system, and the embodiments of the present application are not limited. In the present application, the 5G system is used as an example.

Figure 1:
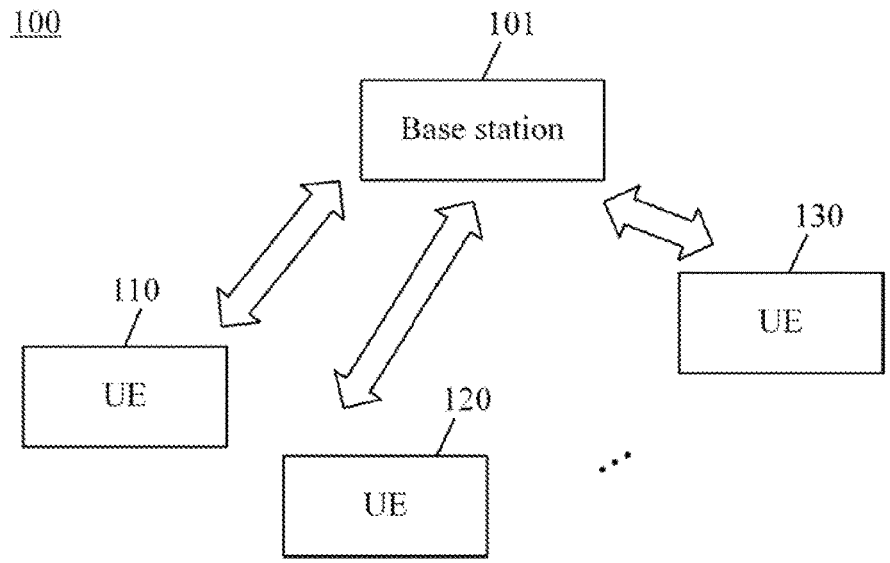
FIG. 1 is a diagram illustrating the structure of a radio network system according to an embodiment of the present application.

This embodiment of the present application may be applied to radio networks of different radio access technologies (RATs). Radio access networks may include different communication nodes in different systems. FIG. 1 is a diagram illustrating the structure of a radio network system according to an embodiment of the present application. As shown in FIG. 1, the radio network system 100 includes a base station 101, a user equipment 110, a user equipment 120 and a user equipment 130. The base station 101 performs wireless communication with the user equipment 110, the user equipment 120 and the user equipment 130 separately.

In this embodiment of the present application, the base station may be a device capable of communicating with a user equipment. The base station may be any device having a wireless transceiving function including, but not limited to, a NodeB, an evolved eNodeB, a base station in the 5G communication system, a base station in a future communication system, an access node in a Wireless Fidelity (Wi-Fi) system, a wireless relay node, a wireless backhaul node and the like. The base station may also be a radio controller in a cloud radio access network (C-RAN) scene. Moreover, the base station may also be a small cell and a transmission node. This is not limited in this embodiment of the present application.

The user equipment is a device having a wireless transceiving function. The device may be deployed on land including being indoor or outdoor, handled, wearable or car-mounted; may also be deployed on water (for example, in ships); and may also be deployed in the air (for example, in airplanes, balloons and satellites). The user equipment may be a mobile phone, a tablet computer, a computer having a wireless transceiving function, a virtual reality (VR) terminal, an augmented reality (AR) terminal, a wireless terminal in industrial control, a wireless terminal in self-driving, a wireless terminal in telemedicine, a wireless terminal in a smart grid, a wireless terminal in transportation safety, a wireless terminal in a smart city and a wireless terminal in smart home. The application scenarios are not limited in this embodiment of the present application. The user equipment sometimes may also be called a terminal, an access terminal, a user equipment (UE) unit, a UE station, a mobile station, a mobile platform, a remote station, a remote terminal, a mobile device, a UE terminal, a wireless communication apparatus, a UE agent or a UE apparatus. This is not limited in this embodiment of the present application.

The uplink channel of the user equipment includes a physical uplink shared channel (PUSCH), a physical uplink control channel (PUCCH) and a physical random access channel (PRACH). Data information, scheduling request (SR), hybrid automatic repeat request acknowledgement (HARQ-ACK) and channel state information (CSI) may be transmitted in the PUSCH. Scheduling request (SR), HARQ-ACK and CSI may be transmitted in the PUCCH.

In New Radio (NR) R15 and R16, the NR system can support the highest frequency 52.6 GHz. In later versions such as R17, the NR system can support a higher frequency band. For the high frequency, a wide frequency spectrum is a shared unlicensed frequency band, for example, above 60 GHz. However, in a higher frequency band, since channel fading and multipath interference are greater, the coverage performance of a PUCCH is lower, and thus the sending mode of the PUCCH needs to be enhanced.

The NR system faces many problems when using unlicensed carrier. First, in some countries and regions, regulatory policies are specified for the use of unlicensed carriers. For example, the user equipment must execute listen-before-talk (LBT), also referred to as clear channel assessment (CCA), before using an unlicensed carrier to transmit data. Only when LBT is successfully executed can the user equipment transmit data on the resource corresponding to the unlicensed carrier. If LBT fails to be executed, data cannot be sent.

In one embodiment, the LBT mode is omnidirectional, without standardized orientation, and includes two categories, one with random backoff and the other without random backoff. For the high frequency, if the omnidirectional LBT mode is still adopted, the probability of spatial reuse is greatly reduced.

The resource allocation of the PUCCH is allocated in units of resource blocks (RBs). One PUCCH can occupy only one RB or a plurality of continuous RBs at each time. For requirements that unlicensed carrier is regulated, the bandwidth occupied by the data which is sent by a user equipment must exceed 80% of the LBT bandwidth. Therefore, PUCCH is usually sent in an interlace mode. However, there is still no conclusion as to how to allocate an interlace unit, especially in high-frequency scenarios.

Beam sending is an effective mode to improve high-frequency band coverage performance. When the base station communicates with a user equipment, the base station sends a signal by using a plurality of antennas to form a beam only in the direction of the communicating user equipment. According to this technique, the direction of escape of the wireless signal can be reduced, and interference to other terminals existing in other places can be prevented or reduced.

Figure 2:
FIG. 2 is a diagram of sending data in one beam direction according to an embodiment.

FIG. 2 is a diagram of sending data in one beam direction according to an embodiment. As shown in FIG. 2, for a PUCCH, only one beam direction can be configured for sending, that is, a user equipment can form a beam along only one beam direction.

Figure 3:
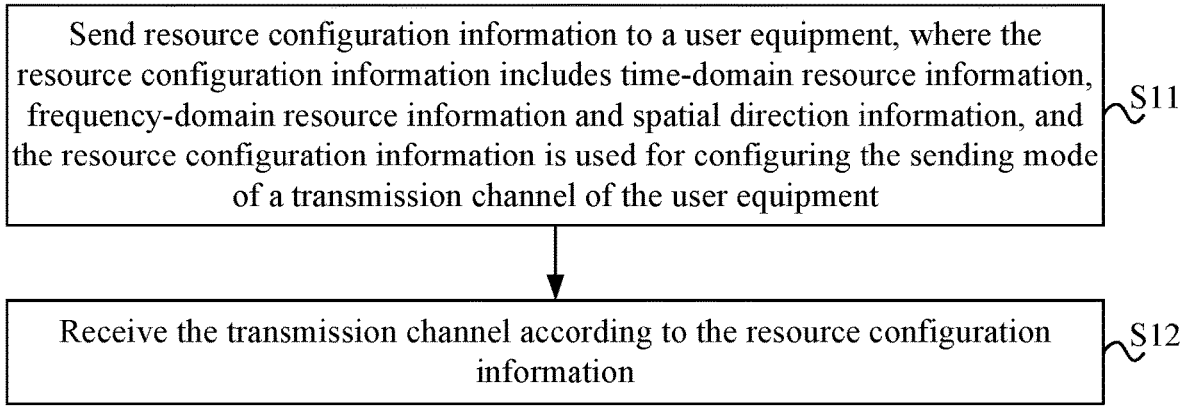
FIG. 3 is a flowchart of a transmission channel configuration method according to an embodiment of the present application.

FIG. 3 is a flowchart of a transmission channel configuration method according to an embodiment of the present application. This method is applicable to a case where a base station configures resources on a high-frequency carrier. This method may be executed by a transmission channel configuration apparatus provided by the present application. The transmission channel configuration apparatus may be implemented by software and/or hardware, and the transmission channel configuration method is applied to a base station.

As shown in FIG. 3, the transmission channel configuration method provided by this embodiment of the present application mainly includes S11 and S12.

In S11, resource configuration information is sent to a user equipment, where the resource configuration information includes time-domain resource information, frequency-domain resource information and spatial direction information, and the resource configuration information is used for configuring the sending mode of a transmission channel of the user equipment.

In S12, a transmission channel is received according to the resource configuration information.

According to the preceding manners, the base station sends the resource configuration information to the user equipment, so that the user equipment configures the transmission channel, thereby enabling the base station and the user equipment to negotiate the sending mode of the high-frequency band transmission channel through the message, thereby solving the problems of degraded transmission channel coverage performance and low data transmission efficiency and enhancing the sending mode of the transmission channel.

In this embodiment, the transmission channel refers to the uplink control channel of the user equipment and mainly includes PUSCH, PUCCH and PRACH. In this embodiment, PUCCH is used as an example for description.

In one embodiment, the resource configuration information is sent to the user equipment through one of a system message, a RRC) signaling, a piece of DCI or a media access control control element (MAC CE).

In one exemplary implementation, the time-domain resource information includes one or more of the number of resource units (RUs), the slot position and the symbol position of a demodulation reference signal (DMRS), a start symbol, the number of symbols or the number of slots.

In this embodiment, the number of slots is used to indicate the number of slots transmitted by PUCCH, and the number of RUs is used to indicate the number of RUs transmitted by PUCCH. The number of RUs and the number of slots are configured by the base station.

In one exemplary implementation, the start symbol is configured to indicate the symbol position in the first slot in the case where a plurality of slots are transmitted in the transmission channel; and the number of symbols is configured to indicate the symbol position in the last slot in the case where a plurality of slots are transmitted in the transmission channel.

In one exemplary implementation, the start symbol is configured to indicate the symbol position in the first RU in the case where a plurality of RUs are transmitted in the transmission channel; and the number of symbols is configured to indicate the symbol position in the last RU in the case where a plurality of RUs are transmitted in the transmission channel.

In one exemplary implementation, the same transmission channel is configured with one or more start symbols.

In one exemplary implementation, the slot position and symbol position of the DMRS are configured to determine the slot in which the DMRS is located and the symbol position in the slot in which the DMRS is located.

In one exemplary implementation, the frequency-domain resource information includes one or more of interlace unit indication information, frequency-domain resource allocation type indication information or frequency-domain resource allocation type switch indication information.

In one exemplary implementation, the interlace unit indication information includes one or more of the following: an interlace unit index, an interlace unit offset, an interlace unit bitmap, a start and length indicator value (SLIV), a sub-band index or an offset with respect to the first resource block (RB) of the sub-band.

In one exemplary implementation, the frequency-domain resource allocation type indication information is configured to indicate a frequency-domain resource allocation mode corresponding to the transmission channel. The frequency-domain resource allocation mode includes a continuous resource allocation mode and an interlace resource allocation mode. The frequency-domain resource allocation type switch indication information is configured to indicate the dynamic switch of the resource allocation mode.

In one exemplary implementation, the spatial direction information is the spatial relationship between a spatial reference signal (RS) and a transmission channel. The RS includes any one of an SSB, a channel state information reference signal (CSI-RS), a sounding reference signal (SRS) or a discovery reference signal (DRS). The spatial direction information is configured by a UE-specific parameter.

In one exemplary implementation, different spatial reference signals (RSs) have a priority order, and different beam directions have a priority order.

Figure 4:
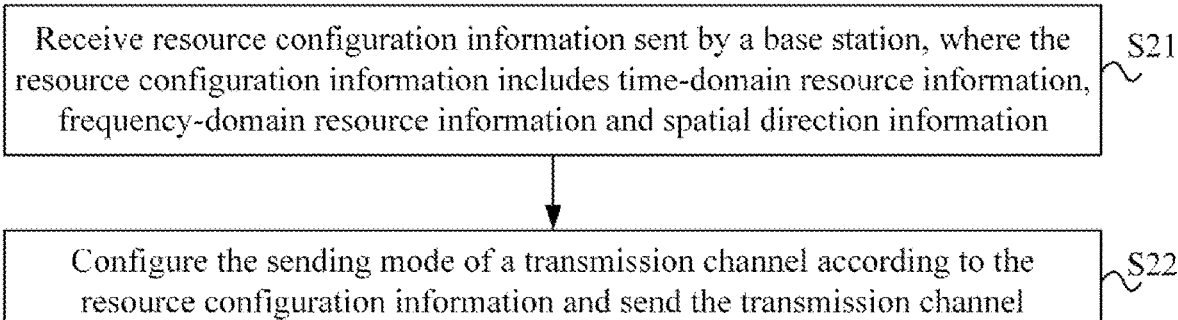
FIG. 4 is a transmission channel sending method according to an embodiment of the present application.

FIG. 4 is a transmission channel sending method according to an embodiment of the present application. This method is applicable to a case where the user equipment configures resources according to the resource configuration information. This method may be executed by a transmission channel sending apparatus provided by the present application. The transmission channel sending apparatus may be implemented by software and/or hardware, and the transmission channel sending method is applied to the user equipment.

As shown in FIG. 4, the transmission channel sending method provided by the present application mainly includes S21 and S22.

In S21, resource configuration information sent by a base station is received. The resource configuration information includes time-domain resource information, frequency-domain resource information and spatial direction information.

In S22, the sending mode of a transmission channel is configured according to the resource configuration information, and the transmission channel is sent.

According to the preceding manners, the user equipment configures the transmission channel according to the resource configuration information sent by the base station, thereby enabling the base station and the user equipment to negotiate the sending mode of the high frequency band transmission channel through the message, thereby solving the problems of degraded transmission channel coverage performance and low data transmission efficiency and enhancing the sending mode of the transmission channel.

In this embodiment, the transmission channel refers to the uplink control channel of the user equipment and mainly includes PUSCH, PUCCH and PRACH. In this embodiment, PUCCH is used as an example for description.

In one exemplary implementation, the time-domain resource information includes one or more of the following: the number of resource units (RUs), the slot position and the symbol position of a demodulation reference signal (DMRS), a start symbol, the number of symbols or the number of slots.

In one exemplary implementation, the start symbol is configured to indicate the symbol position in the first slot in the case where a plurality of slots are transmitted in the transmission channel; and the number of symbols is configured to indicate the symbol position in the last slot in the case where a plurality of slots are transmitted in the transmission channel.

In one exemplary implementation, the start symbol is configured to indicate the symbol position in the first RU in the case where a plurality of RUs are transmitted in the transmission channel; and the number of symbols is configured to indicate the symbol position in the last RU in the case where a plurality of RUs are transmitted in the transmission channel.

In one exemplary implementation, the same transmission channel is configured with one or more start symbols.

In one exemplary implementation, the slot position and symbol position of the DMRS are configured to determine the slot in which the DMRS is located and the symbol position in the slot in which the DMRS is located.

In one exemplary implementation, the frequency-domain resource information includes one or more of the following: interlace unit indication information, frequency-domain resource allocation type indication information or frequency-domain resource allocation type switch indication information.

In one exemplary implementation, the interlace unit indication information includes one or more of the following: an interlace unit index, an interlace unit offset, an interlace unit bitmap, a SLIV, a sub-band index or an offset with respect to the first resource block (RB) of the sub-band.

In one exemplary implementation, the frequency-domain resource allocation type indication information is configured to indicate a frequency-domain resource allocation mode corresponding to the transmission channel. The frequency-domain resource allocation mode includes a continuous resource allocation mode and an interlace resource allocation mode. The frequency-domain resource allocation type switch indication information is configured to indicate the dynamic switch of the resource allocation mode.

In one exemplary implementation, the spatial direction information is the spatial relationship between a spatial RS and a transmission channel. The RS includes any one of an SSB, a CSI-RS, an SRS or a DRS. The spatial direction information is configured by a UE-specific parameter.

In one exemplary implementation, different spatial reference signals (RSs) have a priority order, and different beam directions have a priority order.

In one exemplary implementation, in the case where transmission channels are sent in a plurality of beam directions at the same time, before the transmission channels are sent, the method includes executing listen-before-talk (LBT) in any one of the manners below.

Mode 1: In the case where the transmission channels are discontinuous transmission, for each beam direction, directional Category4 (CAT4) LBT is executed.

Mode 2: In the case where the transmission channels are discontinuous transmission, omnidirectional CAT4 LBT is executed in the first beam direction, and directional CAT2 LBT is executed in the all of beam directions excluding the first beam direction.

Mode 3: For each beam direction, directional CAT2 LBT is executed.

Mode 4: For each of beam direction, LBT is executed sequentially according to a priority order of the beam directions.

Mode 5: In the case where one beam direction angle exceeds an angle threshold, for each beam direction, omnidirectional LBT is executed.

Mode 6: In the case where a broadband occupied by the transmission channel exceeds a broadband threshold, for each beam direction, omnidirectional LBT is executed.

In one exemplary implementation, the sending mode of a transmission channel is configured according to the resource configuration information, and the transmission channel is sent. This method includes that, for each beam direction, LBT is executed sequentially according to a priority order of the beam directions, and in the case where LBT is successfully executed in the each beam direction, a beam direction with a highest priority in a priority order of beam directions is selected to send the transmission channel.

In one exemplary implementation, the sending mode of a transmission channel is configured according to the resource configuration information. This method includes that, in the case where two or more transmission channels have time-domain overlap during a process of repeated sending, the sending mode of the transmission channel is determined according to an execution result of LBT.

In one exemplary implementation, the sending mode of the transmission channel is determined according to an execution result of LBT. This method includes that LBT is executed sequentially according to an order of start symbols of two or more transmission channels, in the case where LBT is successfully executed within a preset number of repetitions of the first transmission channel, the first transmission channel is sent, and in the case where the first transmission channel is successfully sent, the second transmission channel is sent; or in the case where LBT is not successfully executed within a preset number of repetitions of the first transmission channel, the first transmission channel is abandoned sending, LBT is executed at the start position of the second transmission channel, and the second transmission channel is sent.

In one exemplary implementation, the sending mode of the transmission channel is determined according to an execution result of LBT. This method includes that LBT is executed sequentially according to a priority order of control information carried by the transmission channel; and in the case where the LBT is successfully executed, a transmission channel that successfully executes the LBT is sent.

In one exemplary implementation, the sending mode of the transmission channel is determined according to an execution result of LBT. This method includes that for two transmission channels that overlap in a time domain, in the case where any one of the two transmission channels is configured with a plurality of beam directions, LBT is executed in the transmission channel in any one of the configured plurality of beam directions excluding a beam direction with the highest priority and the transmission channel is sent.

It is to be noted that the transmission channel configuration method and the transmission channel sending method in this embodiment of the present application may be used for the unlicensed carrier or the licensed carrier, which is not limited in this embodiment.

The plurality of beam directions described in the present application refer to any one of a plurality of SRS resources, a plurality of DMRS resources, a plurality of CSI-RS resources, a plurality of SSB resources or a plurality of spatial relation info parameters.

The positions of the LBT described in the present application reserve corresponding gap time-domain resources through the frame structure configuration or the puncturing mode during data transmission.

In one application example, the time-domain and the frequency-domain configuration of the PUCCH transmission unit in a high-frequency scenario is described below.

For high frequency bands such as frequency bands above 60 GHz, subcarrier spacing (SCS) larger than the low frequency band, such as 240 kHz, 480 kHz, 960 kHz or 1920 kHz SCS, is generally adopted to combat multipath channel fading. With large SCS, the length of a slot on a time domain is correspondingly reduced. For example, if the slot length corresponding to the original 15 kHz SCS is 1 ms, the slot length corresponding to the 480 kHz SCS is only 0.03125 ms. If NR still takes slot as the basic unit of PUCCH data transmission, the efficiency of data transmission is very low. Therefore, for large SCSs, a larger data transmission unit resource unit (RU) may be introduced to transmit a PUCCH.

In the high frequency bands, a plurality of continuous RUs may be transmitted in one PUCCH. For example, k continuous RUs may be transmitted in one PUCCH, and each RU includes N subcarriers and M slots. The values of N and M can be determined according to SCS. The number of carriers and the number of slots included in the RU may be determined according to the carrier attribute and the time, or the number of carriers and the number of slots included in the RU may be determined according to service types. The base station may configure the number of continuous slots and the number of subcarriers included in each RU through a predefined mode or a RRC signaling configuration mode. k, M and N are all positive integers.

In one embodiment, time slot boundaries between different SCSs are aligned within 1 ms. For example, Table 1 is a table of the number of continuous slots and the number of subcarriers included in SCSs provided by this embodiment of the present application. As shown in Table 1, in the case where the SCS is 120 kHZ, one RU contains 2 slots and 12 subcarriers, and in the case where the SCS is 240 kHZ, one RU contains 4 slots and 6 subcarriers. The number of continuous slots and the number of subcarriers included in different SCSs are shown in Table 1, and details are not described in this embodiment.

TABLE 1

| SCS (kHz) | Number of Slots Included in One RU | Number of Subcarriers Included in One RU |
| --- | --- | --- |
| 120 | 2 | 12 |
| 240 | 4 | 6 |
| 480 | 8 | 3 |
| 960 | 16 | 2 |
| 1920 | 32 | 1 |

For high frequency bands, one RU may transmit one PUCCH, or a plurality of continuous RUs may be transmitted in one PUCCH. The method in which a plurality of RUs may be transmitted in one PUCCH is described in the examples below.

In one embodiment, each PUCCH may be sent in a plurality of beam directions at a time or may be sent in different beam directions at different times. The station (base station or UE) executes LBT before the PUCCH is sent. After the LBT is successfully executed, the PUCCH can be sent in the corresponding direction. How the station executes LBT is described in the examples below.

In one application example, a frequency-domain resource allocation method of a high-frequency PUCCH is described.

The frequency-domain resource allocation of the high-frequency PUCCH includes the frequency-domain resource allocation in the initial access phase and the UE-specific frequency-domain resource allocation after the initial access.

For the initial access phase, the sending of the HARQ-ACK is mainly for the feedback of Msg4 during the random access channel (RACH) process. In the PUCCH resource configuration table configured by RRC signaling, the "physical resource block (PRB) offset" column parameter in 16 or more rows is modified to "interlace index" or "interlace offset". The "interlace offset" value described is the interlace offset value relative to the interlace index 0.

For the initial access phase, the base station configures, through a synchronization signal block (SSB, which includes a primary synchronization signal (PSS), a secondary synchronization signal (SSS), and a physical broadcast signal (PBCH)) or remaining minimum system information (RMSI), Msg3 and whether the frequency-domain resource allocation mode corresponding to the PUCCH is continuous resource allocation or interlace resource allocation.

After the initial access successfully enters the connected state, the base station may indicate resource allocation types through a bit field in the downlink control information (DCI). For example, a continuous resource allocation or an interlace resource allocation is indicated through one bit, or a dynamic switch of the resource allocation type is notified through one bit. If the bit is enabled, the original resource allocation type is switched to another resource allocation type. If the bit is not enabled, the original resource allocation type is not switched. Alternatively, the interlace resource allocation is the default resource allocation mode. When this bit is enabled, the interlace resource allocation is switched to the continuous resource allocation mode.

The DCI includes fallback DCI and non-fallback DCI. The continuous resource allocation is the uplink resource allocation Type 0/1 in R15.

In one application example, the high-frequency PUCCH resource allocation method after the RRC connection is established is described.

When unlicensed carrier is used, several candidate resource sets may be configured to improve the probability of successful sending of PUCCH. Alternatively, the number of PUCCH resources included in each resource set may be increased to multiple.

For example, after the RRC connection is established, the base station configures at most K pieces of PUCCH resource configuration information for one UE through the higher layer RRC signaling. Moreover, the PUCCH resource configuration information is independently allocated by each bandwidth part (BWP). The maximum number of PUCCH resources included in the first PUCCH resource configuration information is T, and the number of other PUCCH resources is t. The maximum number of uplink control information (UCI) bits that can be transmitted by the PUCCH resource configuration information of each set is different. The resources sent by the PUCCH and triggered by each DCI are given through adopting the indication signaling PUCCH resource indicator (PRI) in the DCI. Alternatively, when the number of resources included in the resource set is relatively large, the specific resources of the PUCCH are jointly determined by the PRI signaling and the mode of implicit determination indication.

Resources of each PUCCH include format types of the PUCCH. The format types include PUCCH format 1 and PUCCH format 3. The formats correspond to time-domain resource allocation and frequency-domain position information. The frequency-domain position includes one or more interlace units. The frequency-domain resource of each PUCCH can give a specific "interlace index" or "interlace offset". The "interlace offset" value described is the interlace offset value relative to the interlace index 0.

In one embodiment, the start symbol in the time-domain resource indicator is only used for the first PUCCH, the middle is the complete slot, the number of symbols is used to indicate the last PUCCH, and the number information of RUs occupied by sending of one PUCCH is added. The definition of RU is determined from the preceding examples, and details are not described in this embodiment.

In one embodiment, a plurality of candidate start symbols may be configured for the same PUCCH to increase the probability of acknowledgement/negative acknowledgement (ACK/NACK) sending.

In one embodiment, for spatial domain resource allocation, the spatial configuration of the PUCCH transmission is to configure a spatial relationship between the reference signal (RS) and the PUCCH. RS is any one of SSB/CSI-RS/SRS/DRS, and the parameter is the UE-specific spatial domain resource configuration. The spatial configuration transmitted by the PUCCH includes configuring a plurality of SRS resource indicators for each UE and activating a plurality of spatial configurations. Alternatively, the spatial configuration transmitted by the PUCCH includes configuring a plurality of DMRS port resources, and the DMRS ports and beams of reference signal have a quasi co-location (QCL) relationship.

In one embodiment, the PUCCH resource configuration may be configured for each BWP, each carrier, a plurality of carrier groups or each cell. The configuration update of resources may be notified through RRC signaling, MAC CE or SSB/system information block (SIB).

In one application example, a method of sending a PUCCH in a plurality of beam directions at a high frequency is described.

For the PUCCH, different beam directions may be adopted for sending at different repetition times.

In one embodiment, the PUCCH adopts the non-codebook transmission mode, that is, the spatial information transmitted by the PUCCH references to the precoding corresponding to the SRS resource, and no special transmitted precoding matrix indicator (TPMI) is required.

Figure 5:
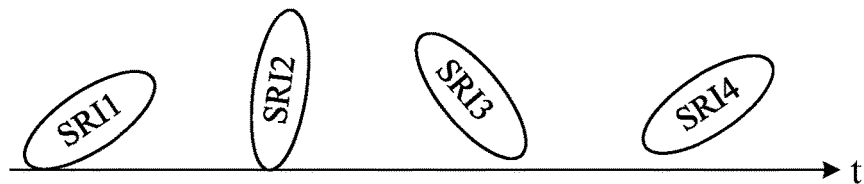
FIG. 5 is a diagram of sending data in different beam directions according to an embodiment of the present application.

FIG. 5 is a diagram of sending data in different beam directions according to an embodiment of the present application. High-frequency PUCCH may adopt the transmission mode shown in FIG. 5, that is, different beam directions are adopted for data transmission at different times. A plurality of PUCCHs carry the same UCI content, or a plurality of PUCCHs carry different redundancy versions (RVs) of the same UCI.

First, the base station configures one piece of SRS resource configuration information. The SRS resource configuration information includes a plurality of SRS resources. One PUCCH is sent by one of the sounding reference signal resource indicator (SRI) resources at each time. SRI1 is for PUCCH1, SRI2 is for PUCCH2, SRI3 is for PUCCH3, and SRI4 is for PUCCH4. PUCCH1 to PUCCH4 carry the same UCI content.

In this mode, the probability of sending PUCCH is improved, and the coverage performance of the PUCCH is improved.

In one application example, another method of sending data by PUCCH in a plurality of beam directions at a high frequency is described.

The base station may configure a plurality of candidate beam directions for the PUCCH of the UE to send data at the same time. The UE may simultaneously execute independent directional LBT in the plurality of beam directions, or when the width range of the plurality of beam directions exceeds a predefined threshold, the UE needs to execute an omnidirectional LBT mode.

In one embodiment, a plurality of candidate beam directions configured have a priority order. The priority order is given at the time of configuration and may be adjusted later.

Figure 6:
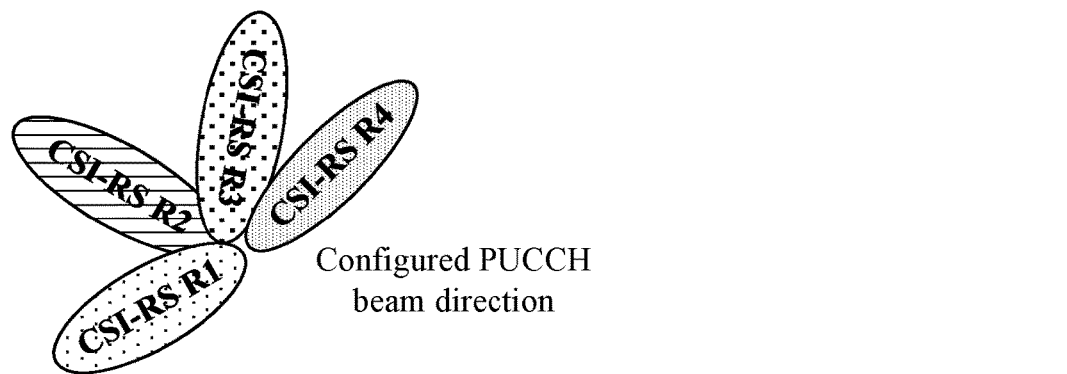
FIG. 6 is a diagram of a beam direction priority according to an embodiment of the present application.
Figure 6:
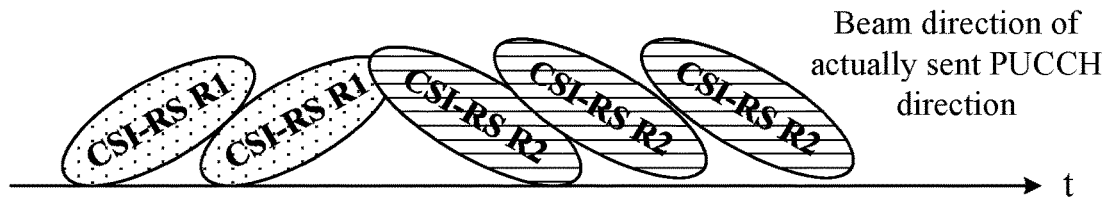

FIG. 6 is a diagram of a beam direction priority according to an embodiment of the present application. As shown in FIG. 6, the base station configures the PUCCH spatial reference signal as CSI-RS, and the base station configures one piece of CSI-RS resource configuration information. The resource configuration information includes a plurality of CSI-RS resources, such as a CSI-RS resource 1, a CSI-RS resource 2, a CSI-RS resource 3 and a CSI-RS resource 4. Different CSI-RS resources have different beam directions. It is assumed that the order of configuration is from the highest to the lowest according to priority, that is, the priority of resource 1>the priority of resource 2>the priority of resource 3>the priority of resource 4. Then, the UE sequentially executes LBT according to the priority order from the highest to the lowest according to the configuration information. Once LBT is executed successfully in a beam direction, the PUCCH is sent in this direction. Alternatively, the UE executes LBT in the plurality of beam directions at the same time. If LBT is executed successfully only in one beam direction, the PUCCH is sent in this direction. If it is greater than or equal to two directions executing LBT successfully, the beam direction with higher priority is selected to send the PUCCH.

In one application example, the mode of LBT executed by continuous transmission of a plurality of RUs performed by one PUCCH is described.

As described in the preceding application examples, a plurality of continuous RUs may be transmitted in one PUCCH on a time domain or one PUCCH is simultaneously sent in a plurality of beam directions or a plurality of candidate beam directions. The LBT mode executed before the sending of the plurality of beams may be performed through one of the following modes.

Mode 1: The omnidirectional CAT4 LBT is executed on the first PUCCH, and if a plurality of RUs or a plurality of RBs occupied by one PUCCH are non-continuous in the middle, the directional CAT2 LBT is executed on the subsequent beams. If the plurality of RUs or the plurality of RBs occupied by one PUCCH are continuous and the first PUCCH executes LBT successfully, LBT is executed using the subsequent beams.

Mode 2: Each beam direction executes the directional CAT4 LBT.

Mode 3: Each beam direction executes the directional CAT2 LBT.

Mode 4: The omnidirectional LBT is executed when the beam direction angle or the broadband exceeds the threshold.

It is to be noted that the mode 2 is applicable to a scenario in which the plurality of RUs or the plurality of RBs occupied by one PUCCH are non-continuous in the middle.

In one embodiment, for the CAT4 LBT, the maintenance of the contention window size (CWS) of each beam is maintained independently and does not affect each other.

In one application example, in order to improve the successful probability of data LBT, the base station may pre-schedule a plurality of beam directions. The UE executes LBT sequentially in the plurality of beam directions according to the priority. The beam direction of which beam executes LBT successfully, then the beam is sent.

If LBT is not executed successfully on a beam, the UCI information on the beam cannot be sent. Therefore, the demodulation performance of the PUCCH can be affected. To solve the preceding problems, the base station may configure a plurality of candidate beams for the UE. When the UE is not executed successfully in one or some of the previous beams LBT, the UE may be postponed. The base station performs detection from the first configured beam, and when the number of repetitions of the configuration is reached, the DCI is sent to indicate the original candidate beam resources to other UEs for use.

This embodiment describes a case where one PUCCH is sent in a plurality of beam directions at the same time.

For the transmission of the PUCCH unlicensed carrier, the base station may configure a plurality of beam directions for sending and, through a plurality of spatial resource configurations, give a specific beam. For the sending of PUCCH, one of the following two methods is selected for sending according to the result of LBT.

In one embodiment, the base station has priority information when configuring a plurality of SRS resources for the UE. When the UE successfully executes LBT in a plurality of beam directions, the base station selects a beam with a higher priority for sending, and the base station performs detection according to the configured priority at the same time.

For example, the RS referenced by the PUCCH spatial domain resources configured by the base station for the UE is SRS. Three SRS resources are configured, and the three SRS resources are sorted according to the priority of SRS1, SRS2 and SRS3. The UE executes LBT in the beam directions corresponding to the three SRS resources simultaneously or separately. If LBT is executed successfully only in one beam direction, the PUCCH is sent in this direction. If LBT is executed successfully in two or three directions, the UE sends PUCCH in the beam direction with higher priority according to the priority order. If the UE executes LBT successfully in both the beam directions corresponding to the SRS1 and the SRS2 resources, the UE selects to send scheduled PUCCH in the beam direction corresponding to the SRS1.

Through this method, the problem that the sending of PUCCH cannot be correctly decoded if the LBT is not executed successfully in a beam direction in the high-frequency unlicensed carrier scenario is solved.

In one application example, a method of transmitting one PUCCH across a slot boundary or transmitting a plurality of RUs is described.

If slots are non-continuous, channels may be lost. Therefore, it is required that the PUCCH has no gap during the repeated process. The time-domain start and length of the repeated PUCCH is required to be different between a plurality of slots.

The PUCCH is transmitted across the slot boundary. In the case where a large SCS is adopted for high frequency, one slot is relatively short. The coverage of the PUCCH can be improved by supporting the transmission across the slot.

Figure 7:
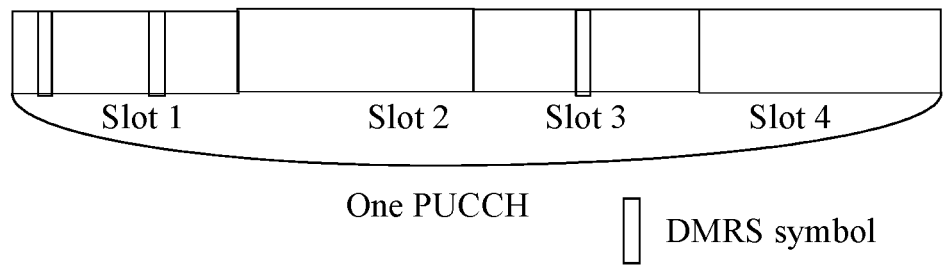
FIG. 7 is a diagram of PUCCH transmission across the slot boundary according to an embodiment of the present application.

FIG. 7 is a diagram of PUCCH transmission across the slot boundary according to an embodiment of the present application. The base station may configure a PUCCH resource to continuously transmit four slots from slot 1. The UCI content sent by the four slots is different, and the slots can share DMRS symbols, that is, not each slot has DMRS symbols. The first and third slots may include DMRS symbols, while the second and fourth slots do not include DMRS symbols. The first and third slots may include only one DMRS symbol or two DMRS symbols. Alternatively, only one of the four slots includes DMRS symbols.

The mapping mode of different UCIs in the plurality of slots may be such that the ACK/NACK maps onto adjacent DMRS symbols on two sides of a DMRS symbol. For example, if a DMRS symbol is located on the fourth symbol of the second slot, the ACK/NACK information is mapped to the third and fifth symbols. Slots without DMRS do not map ACK/NACK information.

The first portion of the CSI information is mapped to the previous slot, and the second portion is mapped to the remaining slot transmitted by the PUCCH.

In one application example, a solution to the case where two PUCCHs have time-domain overlap during repeated transmission or continuous transmission of a plurality of slots or RUs is described.

For the new radio unlicensed spectrum (NR-U), the PUCCH having a high UCI priority may be unable to send due to LBT, and it is also not possible to determine which PUCCH is transmitted first in advance. Therefore, it is necessary to send PUCCH in combination with the result of LBT.

Figure 8:
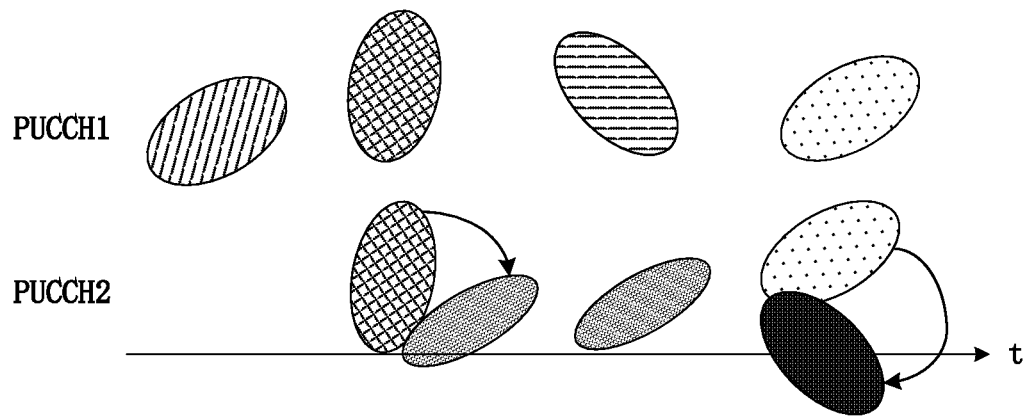
FIG. 8 is a diagram illustrating the execution sequence of LBT in the case of a plurality of beam directions according to an embodiment of the present application.

FIG. 8 is a diagram illustrating the execution sequence of LBT in the case of a plurality of beam directions according to an embodiment of the present application. As shown in FIG. 8, there are two PUCCHs that are repeatedly sent. PUCCH1 is repeatedly sent 4 times. Then during the repeating process, the PUCCH1 overlaps with the repeated PUCCH2 at the beginning or during the repeating process of the second repeating process, the third repeating process or the fourth repeating process. In this case, the UE sends PUCCH according to one of the following rules.

Rule 1: The UE executes LBT according to the order of start symbols of the PUCCH, starting from the small start symbol index. If the UE successfully executes LBT within the first two repetitions of the first PUCCH, the first PUCCH is sent. For the overlapping part, the second PUCCH is punctured until the first PUCCH transmission ends, then the second PUCCH transmission starts.

If LBT is not executed successfully by the UE within the first two repetitions of the first PUCCH, the transmission of the first PUCCH is given up. Then the UE executes LBT at the beginning of the second PUCCH, and after LBT is executed successfully, the second PUCCH is sent.

Rule 2: According to the priority order of UCIs carried by PUCCH, the UE first executes LBT before the start symbol of the PUCCH with the highest priority of UCI. If LBT is executed successfully, the PUCCH is sent. If LBT is not executed successfully, LBT is executed before the PUCCH carried with the second highest priority of UCI is sent. If LBT is executed successfully, the PUCCH is sent. If LBT is not executed successfully, LBT is executed by the PUCCH with the third highest priority, and the PUCCH is sent.

Rule 3: For the overlapping PUCCH with lower priority, another candidate beam direction is selected to send or execute LBT.

As shown in FIG. 8, the time-frequency resource configured by the first slot transmitted by the PUCCH2 is the same as the PUCCH1 in slot 2 or RU2. In this case, if the PUCCH2 is configured with a plurality of candidate beam directions, the UE may select other beam directions of lower priority to execute LBT and send the PUCCH2.

In one application example, a case where two PUCCHs overlap on spatial domain during sending is described.

Figure 9:
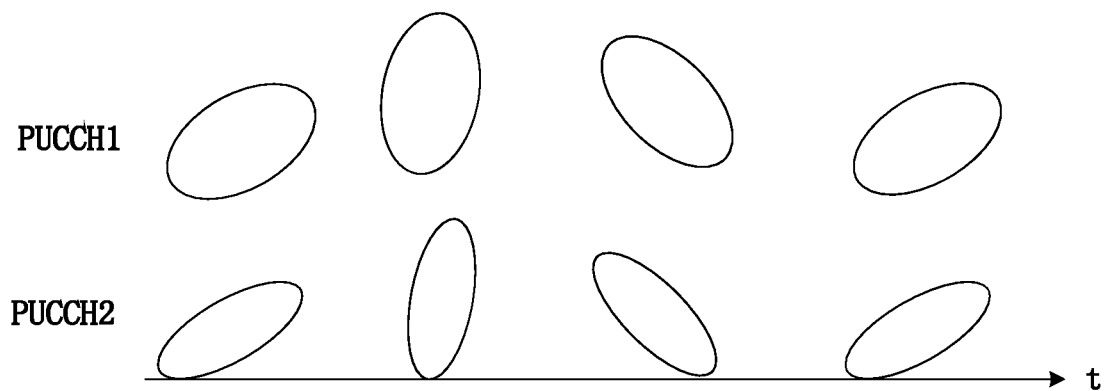
FIG. 9 is another diagram illustrating the execution sequence of LBT in the case of a plurality of beam directions according to an embodiment of the present application.

If the base station configures a UE with PUCCH1 to send repeatedly in a plurality of different beam directions and, at the same time, with PUCCH2 to send repeatedly in a plurality of different beam directions, and the two PUCCHs are overlapped in time and space to some extent, for example, there is an inclusive relationship between the two beams. FIG. 9 is another diagram illustrating the execution sequence of LBT in the case of a plurality of beam directions according to an embodiment of the present application. As shown in FIG. 9, one beam is wide, and one beam is narrow. The UE executes LBT and determines a PUCCH to send finally according to the following method.

The UE first selects a PUCCH having a large beam direction range to execute LBT on the corresponding beam. If LBT is executed successfully, a wide beam is selected to send the corresponding PUCCH. Otherwise, if the UE fails to execute LBT on the wide beam, a narrow beam corresponding to another PUCCH is switched to perform LBT detection. If LBT is executed successfully, the corresponding PUCCH is sent in the narrow beam. If LBT is not executed successfully, the corresponding PUCCH is given up to send.

In one application example, the resource allocation of PUCCH and the HARQ-ACK feedback method of the ultra-reliable low-latency communications (URLLC) service are described.

For the ACK/NACK feedback of the URLLC service, to reduce the data feedback and the delay of repeat, the notification of the DCI does not need to be waited for. Some ACK/NACK feedback for the URLLC service may be configured through the base station configuring the mode of feedback period+offset. In some cases, the UE does not need to perform LBT before feedback. For example, the time difference between the end point of the downlink data transmission and the sending position of the ACK/NACK is less than 16 μs, or the UE only performs LBT detection of 16 μs or 25 μs once, if LBT is executed successfully, the UE can feed back ACK/NACK at these positions and feed back the ACK/NACK of all HARQ processes configured for the URLLC service. At the same time, for each process, one-bit new data indicator (NDI) information is reported to inform the base station whether the ACK/NACK is feedback for the last transmission of PDSCH or for the latest scheduled HARQ-ACK.

Figure 10:
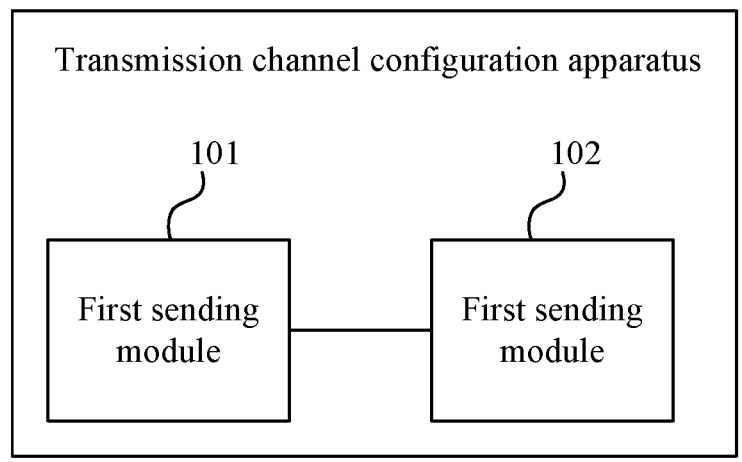
FIG. 10 is a diagram illustrating the structure of a transmission channel configuration apparatus according to an embodiment of the present application.

FIG. 10 is a diagram illustrating the structure of a transmission channel configuration apparatus according to an embodiment of the present application. This apparatus is applicable to a case where a base station configures resources on a high-frequency carrier. The transmission channel configuration apparatus may be implemented by software and/or hardware, and the transmission channel configuration method is applied to the base station.

As shown in FIG. 10, the transmission channel configuration apparatus provided by this embodiment of the present application mainly includes a first sending module 101 and a first receiving module 102.

The first sending module 101 is configured to send resource configuration information to a user equipment. The resource configuration information includes time-domain resource information, frequency-domain resource information and spatial direction information. Moreover, the resource configuration information is used for configuring the sending mode of a transmission channel of the user equipment.

The first receiving module 102 is configured to receive the transmission channel according to the resource configuration information.

The transmission channel configuration apparatus provided by this embodiment is applied to the transmission channel configuration method of the embodiments of the present application. The transmission channel configuration apparatus provided by this embodiment has similar implementation principles and technical effects to the transmission channel configuration method of the embodiments of the present application, which is not repeated here.

In one exemplary implementation, the time-domain resource information includes one or more of the following: the number of resource units (RUs), the slot position and the symbol position of a demodulation reference signal (DMRS), a start symbol, the number of symbols or the number of slots.

In one exemplary implementation, the start symbol is configured to indicate the symbol position in the first slot in the case where a plurality of slots are transmitted in the transmission channel; and the number of symbols is configured to indicate the symbol position in the last slot in the case where a plurality of slots are transmitted in the transmission channel.

In one exemplary implementation, the start symbol is configured to indicate the symbol position in the first RU in the case where a plurality of RUs are transmitted in the transmission channel; and the number of symbols is configured to indicate the symbol position in the last RU in the case where a plurality of RUs are transmitted in the transmission channel.

In one exemplary implementation, the same transmission channel is configured with one or more start symbols.

In one exemplary implementation, the slot position and symbol position of the DMRS are configured to determine the slot in which the DMRS is located and the symbol position in the slot in which the DMRS is located.

In one exemplary implementation, the frequency-domain resource information includes one or more of the following: interlace unit indication information, frequency-domain resource allocation type indication information or frequency-domain resource allocation type switch indication information.

In one exemplary implementation, the interlace unit indication information includes one or more of the following: an interlace unit index, an interlace unit offset, an interlace unit bitmap, a SLIV, a sub-band index or an offset with respect to the first resource block (RB) of the sub-band.

In one exemplary implementation, the frequency-domain resource allocation type indication information is configured to indicate a frequency-domain resource allocation mode corresponding to the transmission channel. The frequency-domain resource allocation mode includes a continuous resource allocation mode and an interlace resource allocation mode. The frequency-domain resource allocation type switch indication information is configured to indicate the dynamic switch of the resource allocation mode.

In one exemplary implementation, the spatial direction information is the spatial relationship between a spatial RS and a transmission channel. The RS includes any one of an SSB, a CSI-RS, an SRS or a DRS. The spatial direction information is configured by a UE-specific parameter.

In one exemplary implementation, different spatial reference signals (RSs) have a priority order, and different beam directions have a priority order.

Figure 11:
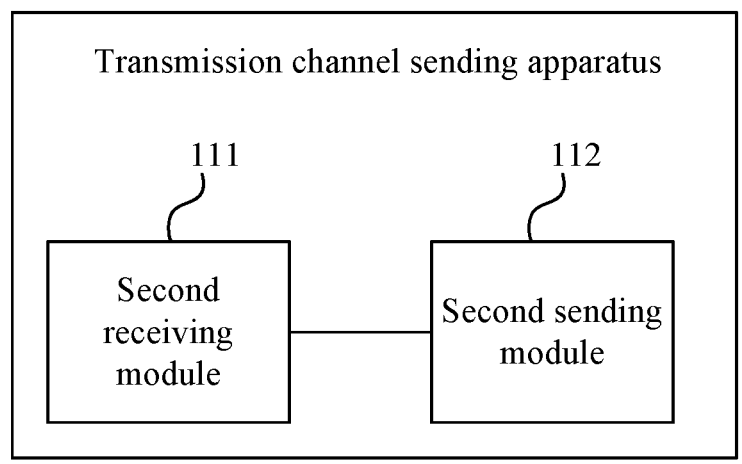
FIG. 11 is a diagram illustrating the structure of a transmission channel sending apparatus according to an embodiment of the present application.

FIG. 11 is a diagram illustrating the structure of a transmission channel sending apparatus according to an embodiment of the present application. This method is applicable to a case where the user equipment configures resources according to the resource configuration information. The transmission channel sending apparatus may be implemented by software and/or hardware, and the transmission channel sending method is applied to the user equipment.

As shown in FIG. 11, the transmission channel sending apparatus provided by the present application mainly includes a second receiving module 111 and a second sending module 112.

The second receiving module 111 is configured to receive resource configuration information sent by a base station. The resource configuration information includes time-domain resource information, frequency-domain resource information and spatial direction information.

The second sending module 112 is configured to configure the sending mode of a transmission channel according to the resource configuration information and send the transmission channel.

The transmission channel sending apparatus provided by this embodiment is applied to the transmission channel sending method of the embodiments of the present application. The transmission channel sending apparatus provided by this embodiment has similar implementation principles and technical effects to the transmission channel sending method of the embodiments of the present application, which is not repeated here.

In one exemplary implementation, the apparatus further includes an LBT execution module. The LBT execution module is configured to, in the case where the transmission channel is sent in a plurality of beam directions at the same time and before the transmission channel is sent, execute LBT in any one of the manners below.

Mode 1: In the case where the transmission channel is discontinuous transmission, for each beam direction, directional CAT4 LBT is executed.

Mode 2: In the case where the transmission channel is discontinuous transmission, omnidirectional CAT4 LBT is executed in the first beam direction, and directional CAT2 LBT is executed in the all of beam directions excluding the first beam direction.

Mode 3: For each beam direction, directional CAT2 LBT is executed.

Mode 4: For each of beam direction, LBT is executed sequentially according to the priority order of the beam directions.

Mode 5: In the case where one beam direction angle exceeds an angle threshold, for each beam direction, omnidirectional LBT is executed.

Mode 6: In the case where a broadband occupied by the transmission channel exceeds a broadband threshold, for each beam direction, omnidirectional LBT is executed.

In one exemplary implementation, the second sending module 112 is configured to, for each beam direction, execute LBT sequentially according to a priority order of the beam directions, and in the case where LBT is successfully executed in the each beam direction, select a beam direction with a highest priority in a priority order of beam directions to send the transmission channel.

In one exemplary implementation, the second sending module 112 is configured to, in the case where two or more transmission channels have time-domain overlap during a process of repeated sending, determine the sending mode of the transmission channel according to an execution result of LBT.

In one exemplary implementation, the second sending module 112 is configured to, according to an order of start symbols of two or more transmission channels, execute LBT sequentially; in the case where LBT is successfully executed within a preset number of repetitions of the first transmission channel, send the first transmission channel, and in the case where the first transmission channel is successfully sent, send the second transmission channel; or in the case where LBT is not successfully executed within a preset number of repetitions of a first transmission channel, give up sending a first transmission channel and, at the start position of a second transmission channel, execute LBT and send the second transmission channel.

In one exemplary implementation, the second sending module 112 is configured to execute LBT sequentially according to the priority order of control information carried by the transmission channel; and in the case where LBT is successfully executed, send a transmission channel that successfully executes LBT.

In one exemplary implementation, the second sending module 112 is configured to that, for two transmission channels that overlap in a time domain, in the case where any one of the two transmission channels is configured with a plurality of beam directions, LBT is executed in the transmission channel in any one of the configured plurality of beam directions excluding a beam direction with the highest priority and the transmission channel is sent.

Figure 12:
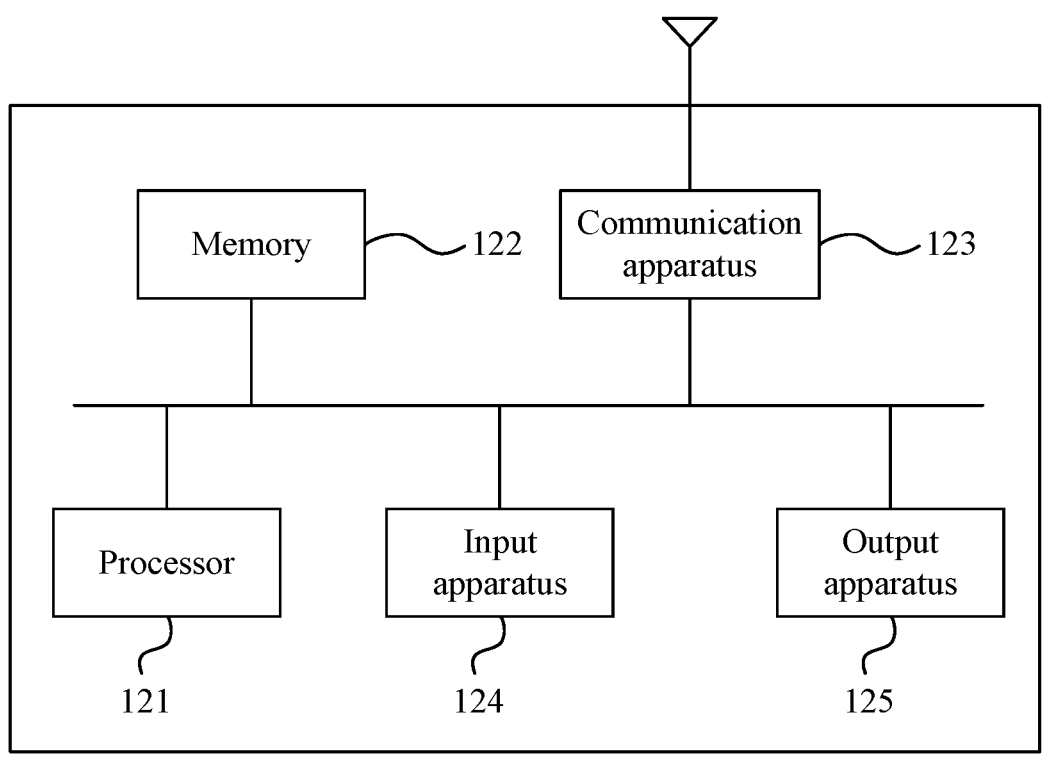
FIG. 12 is a diagram illustrating the structure of a device according to the present application.

An embodiment of the present application further provides a device. FIG. 12 is a diagram illustrating the structure of a device according to the present application. As shown in FIG. 12, the device provided in the present application includes one or more processors 121 and a memory 122. One or more processors 121 may be provided in the device. In FIG. 12, one processor 121 is used as an example. The memory 122 is used for storing one or more programs. When executed by the one or more processors 121, the one or more programs cause the one or more processors 121 to implement the method described in embodiments of the present application.

The device further includes a communication apparatus 123, an input apparatus 124 and an output apparatus 125.

The processor 121, the memory 122, the communication apparatus 123, the input apparatus 124 and the output apparatus 125 in the device may be connected through a bus or other means, with connection through a bus as an example in FIG. 12.

The input apparatus 124 may be used for receiving inputted digital or character information and for generating soft key signal input related to user settings and function control of the device. The output apparatus 125 may include display apparatuses such as a display screen.

The communication apparatus 123 may include a receiver and a transmitter. The communication apparatus 123 is configured to perform information transceiving communication under the control of the processor 121.

As a computer-readable storage medium, the memory 122 may be configured to store software programs, computer-executable programs and modules, such as program instructions/modules (for example, the first sending module 101 and the first receiving module 102 that are in the transmission channel configuration apparatus) corresponding to the transmission channel configuration method according to embodiments of the present application, and program instructions/modules (for example, the second receiving module 111 and the second sending module 112 that are in the transmission channel sending apparatus) corresponding to the transmission channel sending method according to embodiments of the present application. The memory 122 may include a storage program region and a storage data region, where the storage program region may store an operating system and an application program required by at least one function, and the storage data region may store data created depending on the use of the apparatus. Moreover, the memory 122 may include a high-speed random access memory and may further include a nonvolatile memory such as at least one disk memory, flash memory or another nonvolatile solid state memory. In some examples, the memory 122 may include memories which are remotely disposed relative to the processor 121, and these remote memories may be connected to the apparatus through a network. Examples of the preceding network include, but are not limited to, the Internet, an intranet, a local area network, a mobile communication network and a combination thereof.

It is to be noted that, in the case where the device provided by embodiments of the present application is a base station, the preceding device may implement the transmission channel configuration method described in any one of embodiments of the present application. The method includes sending resource configuration information to a user equipment and receiving the transmission channel according to the resource configuration information. The resource configuration information includes time-domain resource information, frequency-domain resource information and spatial direction information. Moreover, the resource configuration information is used for configuring the sending mode of a transmission channel of the user equipment.

In the case where the device provided by embodiments of the present application is UE, the preceding device may implement the transmission channel sending method described in any one of embodiments of the present application. The method includes receiving resource configuration information sent by a base station, configuring the sending mode of a transmission channel according to the resource configuration information and sending the transmission channel. The resource configuration information includes time-domain resource information, frequency-domain resource information, and spatial direction information.

A storage medium is provided in an embodiment of the present application. The storage medium is configured to store a computer program, where the computer program, when executed by a processor, implements the method of any embodiment in the present application.

The transmission channel configuration method according to any one of embodiments of the present application includes sending resource configuration information to a user equipment and receiving the transmission channel according to the resource configuration information. The resource configuration information includes time-domain resource information, frequency-domain resource information and spatial direction information. Moreover, the resource configuration information is used for configuring the sending mode of a transmission channel of the user equipment.

The transmission channel sending method according to any one of embodiments of the present application includes receiving resource configuration information sent by a base station, configuring the sending mode of a transmission channel according to the resource configuration information and sending the transmission channel. The resource configuration information includes time-domain resource information, frequency-domain resource information and spatial direction information.

The preceding is only example embodiments of the present application and is not intended to limit the scope of the present application.

It is to be understood by those skilled in the art that the term "user terminal" covers any suitable type of radio UE, for example, a mobile phone, a portable data processing apparatus, a portable web browser or a vehicle-mounted mobile station.

In general, multiple embodiments of the present application may be implemented in hardware, a dedicated circuit, software, logic or any combination thereof. For example, some aspects may be implemented in hardware while other aspects may be implemented in firmware or software that may be performed by a controller, a microprocessor or other computing apparatuses, though the present application is not limited thereto.

Embodiments of the present application may be implemented by computer program instructions executed by a data processor of a mobile apparatus, for example, in a processor entity, by hardware or by a combination of software and hardware. The computer program instructions may be assembly instructions, instruction set architecture (ISA) instructions, machine instructions, machine-related instructions, microcodes, firmware instructions, status setting data or source or object codes written in any combination of one or more programming languages.

A block diagram of any logic flow among the drawings of the present application may represent program processes, may represent interconnected logic circuits, modules and functions or may represent a combination of program processes with logic circuits, modules and functions. Computer programs may be stored in a memory. The memory may be of any type suitable for a local technical environment and may be implemented using any suitable data storage technology, such as, but not limited to, a read-only memory (ROM), a random-access memory (RAM) and an optical memory apparatus and system (digital video disc (DVD) or compact disc (CD)). Computer-readable media may include non-transitory storage media. The data processor may be of any type suitable for the local technical environment, such as, but is not limited to, a general-purpose computer, a special-purpose computer, a microprocessor, a digital signal processor (DSP), an application specific integrated circuit (ASIC), a field-programmable gate array (FPGA) and a processor based on a multi-core processor architecture.

What is claimed is:

1. A transmission channel configuration method, comprising:
   sending resource configuration information to a user equipment, wherein the resource configuration information comprises time-domain resource information, frequency-domain resource information and spatial direction information, and the resource configuration information is used for configuring a sending mode of a transmission channel of the user equipment; and
   receiving the transmission channel according to the resource configuration information;
   wherein the time-domain resource information comprises a start symbol;
   wherein the start symbol is configured to indicate a symbol position in a first slot in a case where a plurality of slots are transmitted in the transmission channel; and the number of symbols is configured to indicate a symbol position in a last slot in a case where a plurality of slots are transmitted in the transmission channel; or
   the start symbol is configured to indicate a symbol position in a first resource unit (RU) in a case where a plurality of RUs are transmitted in the transmission channel; and the number of symbols is configured to indicate a symbol position in a last RU in a case where a plurality of RUs are transmitted in the transmission channel.

2. The method of claim 1, wherein a same transmission channel is configured with at least one start symbol.

3. The method of claim 1, wherein the time-domain resource information further comprises a slot position of a demodulation reference signal (DMRS) and a symbol position of the DMRS, the slot position of the DMRS and the symbol position of the DMRS are configured to determine a slot in which the DMRS is located and a symbol position in the slot in which the DMRS is located.

4. The method of claim 1, wherein the frequency-domain resource information comprises at least one of interlace unit indication information, frequency-domain resource allocation type indication information or frequency-domain resource allocation type switch indication information.

5. The method of claim 4, wherein the interlace unit indication information comprises at least one of an interlace unit index, an interlace unit offset, an interlace unit bitmap, a start interlace unit and a start and length indicator value (SLIV), a sub-band index or an offset with respect to a first resource block (RB) of a sub-band.

6. The method of claim 4, wherein the frequency-domain resource allocation type indication information is configured to indicate a frequency-domain resource allocation mode corresponding to the transmission channel, wherein the frequency-domain resource allocation mode comprises a continuous resource allocation mode and an interlace resource allocation mode; and the frequency-domain resource allocation type switch indication information is configured to indicate a dynamic switch of a resource allocation mode.

7. The method of claim 1, wherein the spatial direction information is a spatial relationship between a reference signal (RS) and the transmission channel, wherein the RS comprises any one of a synchronization signal block (SSB), a channel state information reference signal (CSI-RS), a sounding reference signal (SRS) or a discovery reference signal (DRS); and the spatial direction information is configured by a UE-specific parameter.

8. The method of claim 7, wherein different spatial reference signals (RS) have a priority order, and different beam directions have a priority order.

9. A non-transitory computer-readable storage medium for storing computer programs which, when executed by a processor, implement the method of claim 1.

10. A transmission channel sending method, comprising:
receiving resource configuration information sent by a base station, wherein the resource configuration information comprises time-domain resource information, frequency-domain resource information and spatial direction information; and
configuring a sending mode of a transmission channel according to the resource configuration information and sending the transmission channel;
wherein in a case where the transmission channel is sent in a plurality of beam directions at the same time, before the transmission channel is sent, the method comprising executing listen-before-talk (LBT) in any one of the following manners:
in a case where a plurality of resource units (RUs) or a plurality of resource blocks (RBs) occupied by the transmission channel are in discontinuous transmission, for each of the plurality of beam directions, directional Category4 (CAT4) LBT is executed;
in a case where the plurality of RUs or the plurality of RBs occupied by the transmission channel are in discontinuous transmission, omnidirectional CAT4 LBT is executed in a first beam direction of the plurality of beam directions, and directional CAT2 LBT is executed in the plurality of beam directions excluding the first beam direction;
for each of the plurality of beam directions, directional CAT2 LBT is executed;
for each of the plurality of beam directions, LBT is executed sequentially according to a priority order of beam directions;
in a case where a beam direction angle exceeds an angle threshold, for each of the plurality of beam directions, omnidirectional LBT is executed; or
in a case where a broadband occupied by the transmission channel exceeds a broadband threshold, for each of the plurality of beam directions, omnidirectional LBT is executed.

11. The method of claim 10, wherein configuring the sending mode of the transmission channel according to the resource configuration information and sending the transmission channel comprises:
for each beam direction, executing LBT sequentially according to a priority order of beam directions, and in a case where the LBT is successfully executed in the each beam direction, sending the transmission channel in a beam direction with a highest priority in the priority order of beam directions.

12. The method of claim 10, wherein configuring the sending mode of the transmission channel according to the resource configuration information comprises:
in a case where a plurality of transmission channels have time-domain overlap during a process of repeated sending, determining the sending mode of the transmission channel according to an execution result of the LBT.

13. The method of claim 12, wherein determining the sending mode of the transmission channel according to the execution result of the LBT comprises:
executing the LBT sequentially according to an order of start symbols of a plurality of transmission channels;
in a case where the LBT is successfully executed within a preset number of repetitions of a first transmission channel, sending a first transmission channel, and in a case where the first transmission channel is successfully sent, sending a second transmission channel; and
in a case where the LBT is not successfully executed within a preset number of repetitions of a first transmission channel, abandoning sending a first transmission channel, executing the LBT at a start position of a second transmission channel, and sending the second transmission channel.

14. The method of claim 12, wherein determining the sending mode of the transmission channel according to the execution result of the LBT comprises:
executing the LBT sequentially according to a priority order of control information carried by the transmission channel; and
in a case where the LBT is successfully executed, sending a transmission channel in which the LBT is successfully executed.

15. A transmission channel sending apparatus, comprising:
one or more processors; and
a memory configured to store one or more programs, wherein
when executed by the one or more processors, the one or more programs cause the one or more processors to the method of claim 10.

16. A transmission channel configuration apparatus, comprising:

one or more processors; and a memory configured to store one or more programs, wherein when executed by the one or more processors, the one or more programs cause the one or more processors to:

send resource configuration information to a user equipment, wherein the resource configuration information comprises time-domain resource information, frequency-domain resource information and spatial direction information, and the resource configuration information is used for configuring a sending mode of a transmission channel of the user equipment; and receive the transmission channel according to the resource configuration information;

wherein the time-domain resource information comprises a start symbol;

wherein the start symbol is configured to indicate a symbol position in a first slot in a case where a plurality of slots are transmitted in the transmission channel; and the number of symbols is configured to indicate a symbol position in a last slot in a case where a plurality of slots are transmitted in the transmission channel; or the start symbol is configured to indicate a symbol position in a first resource unit (RU) in a case where a plurality of RUs are transmitted in the transmission channel; and the number of symbols is configured to indicate a symbol position in a last RU in a case where a plurality of RUs are transmitted in the transmission channel.

\* \* \* \* \*